Nov. 24, 1953

L. B. RIES 2,659,984

FLIGHT AND BANK LEVEL INDICATOR

Filed March 14, 1952

INVENTOR
Lewis B. Ries

BY Shoemaker & Mattare

ATTORNEYS

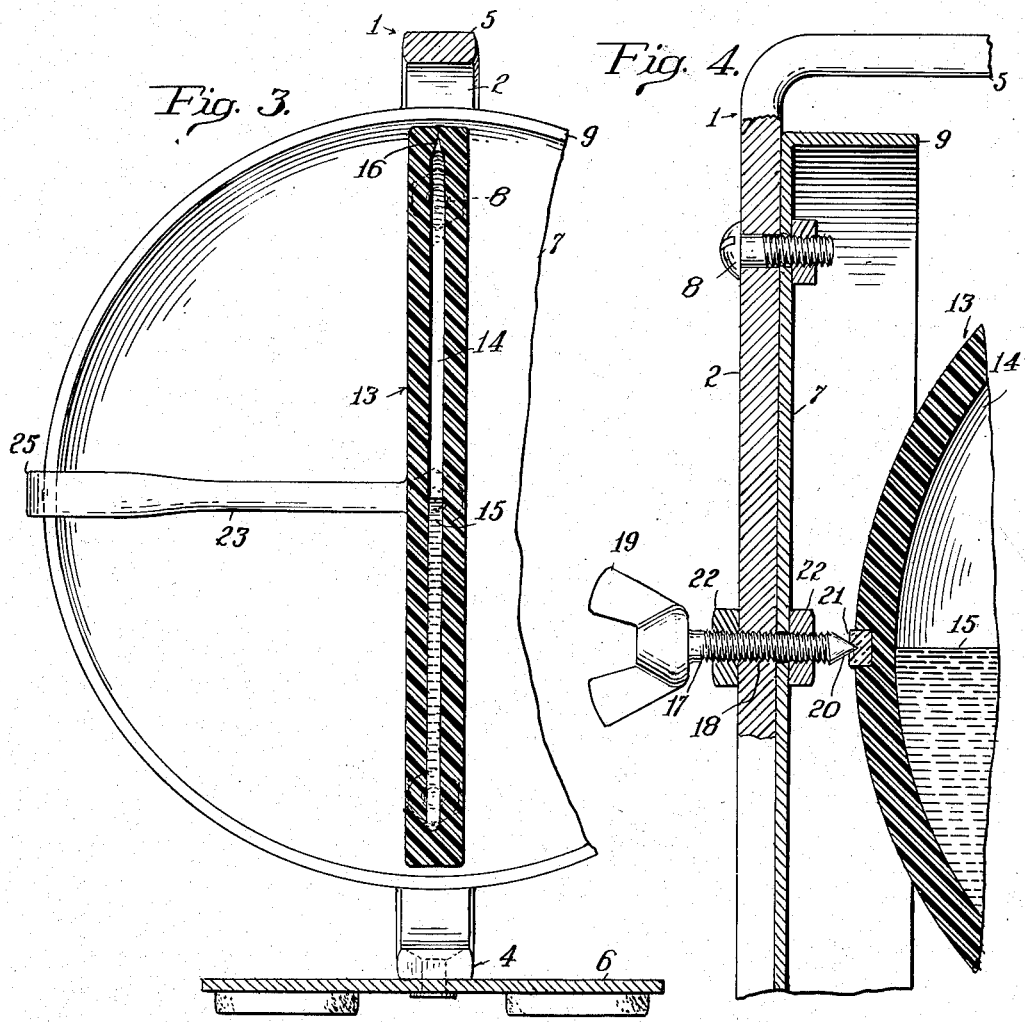

Patented Nov. 24, 1953

2,659,984

UNITED STATES PATENT OFFICE 2,659,984

FLIGHT AND BANK LEVEL INDICATOR

Lewis B. Ries, Monessen, Pa.

Application March 14, 1952, Serial No. 276,630

1 Claim. (Cl. 33—206)

This invention relates to an inclinometer which is particularly adapted for use upon an aircraft and may be referred to as a flight and bank level indicator as it serves very effectively to indicate longitudinal tilting of an aircraft out of its normal position and also transverse tilting of an aircraft while in flight.

When an aircraft is in flight, the body or fuselage should be kept horizontal longitudinally so that the wings or airfoils will be at the proper angle of incident except when fast climbing is desired or the aircraft is nosed over and gliding to a landing. It is also important that the fuselage and the wings be held level transversely except when banking for a turn as otherwise the aircraft is liable to get into a side slip out of which it is difficult, and sometimes impossible, to bring the aircraft without sufficient altitude.

Instruments are now provided upon the instrument boards of aircraft for indicating longitudinal tilt and transverse tilt but have been found unsatisfactory as separate instruments are used for indicating longitudinal and transverse tilting, thus making it necessary for the pilot to look back and forth from one instrument to another and failing to notice a dangerous gliding angle or climbing angle or danger of a side slip occurring. Attempts have been made to produce an instrument which will indicate both longitudinal tilts and transverse tilts but they have not been successful as they were too complicated or of such construction that they could not be readily seen and quickly and accurately read by a pilot handling the controls of an aircraft and this is important as quick action is necessary in order to counteract undesirable tilting movements of an aircraft.

It is, therefore, one object of this invention to provide an improved inclinometer including improved mechanism for indicating both longitudinal and transverse tilt of an aircraft out of its normal position when in flight, the mechanism being such that when a pilot looks at one instrument, he may quickly and accurately note tilt either longitudinally or transversely or both, at the same time.

Another object of the invention is to provide an improved instrument of this character including individual gauges for indicating longitudinal and transverse tilting movements, the gauge for indicating transverse tilt cooperating with the other gauge to indicate longitudinal tilts.

Another object of the invention is to provide an inclinometer having improved gauge members which may operate individually or simultaneously to indicate tilting of an aircraft and wherein the gauge members are of sturdy construction and not liable to be broken or get out of working order.

With these and other objects in view, the invention consists of an improved construction and arrangement of parts, a practical embodiment of which is illustrated in the accompanying drawings wherein:

Fig. 3 is a sectional view taken vertically along the line 3—3 of Fig. 1;

Fig. 4 is a fragmentary sectional view taken vertically along the line 4—4 of Fig. 2;

Fig. 5 is a fragmentary horizontal sectional view taken along the line 5—5 of Fig. 1; and Fig. 6 is a view similar to Fig. 5 showing a modified construction.

Figure 1:
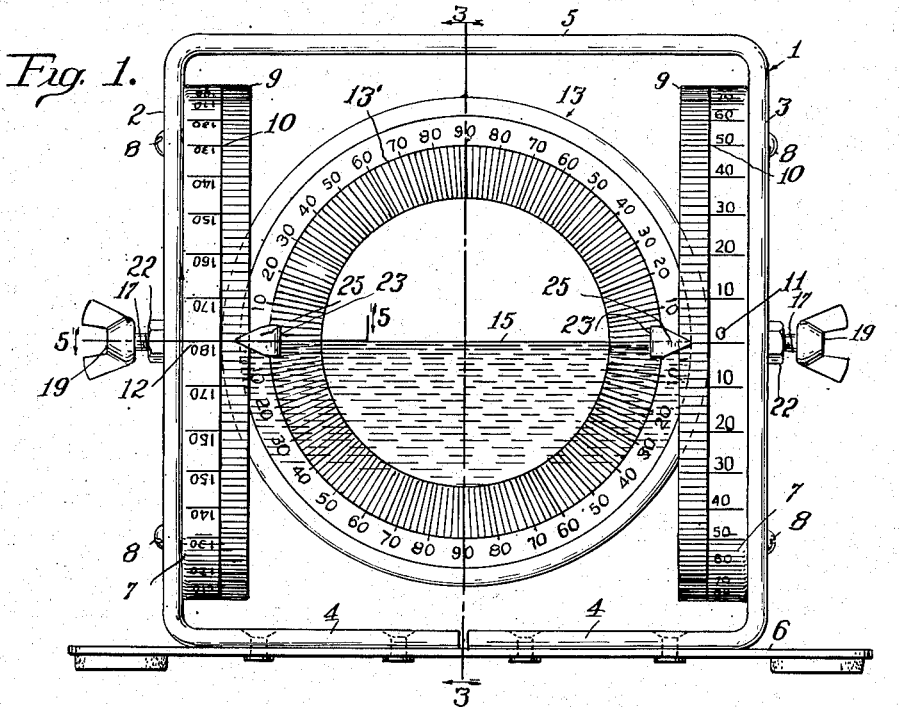
Fig. 1 is a front elevation of the instrument upon an enlarged scale.

This improved flight and bank level indicator, which may be termed an inclinometer, has been illustrated upon an enlarged scale for the sake of clearness, but it will be understood that in actual practice, it will be of approximately the size of a medium sized watch, so that it may be mounted upon an instrument board of an airplane or other aircraft along with other instruments mounted thereon.

The frame 1 of the instrument is formed of stiff metal and has side bars 2 and 3 connected at their lower ends by a lower cross bar 4 and at their upper ends by a cross bar 5. The lower cross bar has been shown riveted to a base 6 by means of which the frame is supported in an upright position, but it will be understood that other means may be provided for supporting the frame, or the base entirely omitted and the frame mounted upon the instrument board in any desired manner.

Disks 7, which are circular, are secured against inner side faces of the side bars or standards 2 and 3 by screws 8 or in any other desired manner, and each disk is formed with a circumferentially extending marginal flange 9 which projects inwardly of the frame and upon its outer surface bears scale markings 10, starting with a zero 11 at one end of a horizontal diameter of the disk, and terminating with the 180° mark 12 at the other end of the horizontal diameter.

Figure 2:
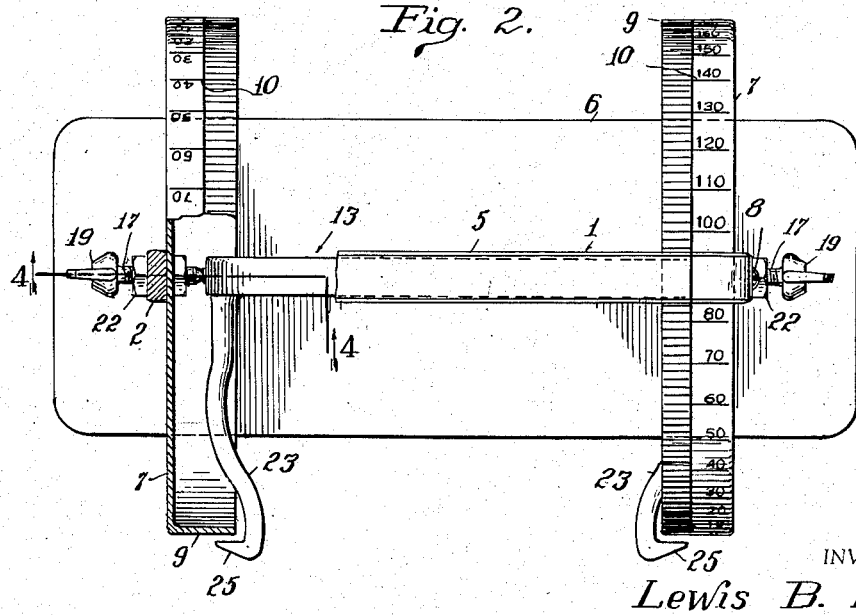
Fig. 2 is a top plan view thereof.

Referring to Figs. 1 and 2, it will be seen that the zero mark of one of the disks or gauge members 7 is at the front of the instrument and the 180° mark at the rear of the instrument, whereas the other disk or gauge member has its 180° mark at the front of the instrument and its zero mark at the rear. It should also be noted that the scale markings progress from the zero mark to the 180° mark along upper portions of the gauge members and also along lower portions thereof. By so arranging the scale markings, the gauge members will indicate longitudinal tilt of an aircraft when the craft is gliding toward the ground, or tilted upwardly to a climbing angle.

Between the gauge members 7 there is disposed a second gauge member 13 which cooperates with the gauge members 7 for indicating longitudinal tilt of an aircraft and also serves for indicating transverse tilt of an aircraft. This gauge member 13 is circular in shape and is formed of transparent material such as plastic or other suitable material. Referring particularly to Fig. 3, it will be seen that the gauge member 13 is hollow, thus providing it with a chamber 14 occupying the major portion of its area, and has front and rear walls parallel with the front and rear surfaces of the gauge member. The front and rear walls of the chamber 14 are spaced from each other a short distance and this chamber contains a liquid 15 which may be mercury, alcohol, or any other suitable liquid substance which will flow freely in the chamber. Mercury is preferably used as it is a shiny substance and may be clearly seen when the pilot of an aircraft looks at the instrument.

The liquid is poured into the chamber through a filling opening initially provided and this opening then sealed, as shown at 16 in Fig. 3. It should also be noted that the quantity of mercury or other liquid poured into the chamber constitutes half the capacity of the chamber. Therefore, when the gauge member 13 is disposed in an upright position, the flat surface of this liquid will be flush with the scale markings 13' which are provided circumferentially of the front surface of the gauge member and start with the zero at opposite ends of the horizontal axis of the gauge member and progress upwardly and downwardly to 90° at opposite ends of the vertical axis of the gauge member.

Another advantage gained by using mercury is that it is not subject to expansion or contraction by changes in temperature and its upper surface will, therefore, always be disposed in a flat horizontal plane between the zero marks of the gauge member. The scale markings may be applied in any desired manner to the gauge member but are preferably formed while molding the same and these scale markings are coated with luminous paint or the like so that they will glow and may be readily seen by the pilot.

In order to pivotally mount the gauge member 13 for tilting movement forwardly and rearwardly of an aircraft, there have been provided threaded pins 17 which pass through openings 18 formed horizontally through the side bars or standards 2 and 3, and at their outer ends are formed with wing heads 19 by means of which they may be readily turned for adjusting them. The inner ends of the threaded pins are tapered to a point as shown at 20 and these tapered ends of the pins engage bearings 21 which are mounted at opposite ends of the horizontal axis of the gauge member and are similar to the jewels used as bearings for a watch. These bearings are embedded in the annular marginal wall portion of the gauge member during molding of the gauge member and will, therefore, be firmly seated and cannot move out of their proper positions. It will be understood that other methods may be employed for mounting the bearings at opposite sides of the gauge member. After the gauge member has been disposed between the standards or posts 2 and 3, the pins are turned in a tightening direction until their tapered ends are properly engaged with the bearings, and the nuts 22 are then tightened to hold the pins in the adjusted position. It will thus be seen that the gauge member 13 will be pivotally mounted in the frame and between the gauge members 7. Since the mercury or other liquid gathers in the lower portion of the chamber 14 and fills this chamber to the horizontal diameter of the gauge member, the liquid will serve as a weight and the gauge member will at all times be maintained in a vertical position when the aircraft is in its normal position of flight or the nose of the aircraft tilted downwardly for a glide or tilted upwardly to a climbing angle. The liquid cooperates with the scale markings 13' upon the front surface of the gauge 13 and when its surface is flush with the zero marks at opposite sides of the gauge member, this will indicate that the aircraft is level transversely. In case the aircraft should tilt or list toward the right or left, the amount of tilt will be accurately indicated by change of position of the surface of the liquid above or below the zero marks of the scale 13' and the pilot will be warned that there is danger of the aircraft getting into a side slip and then will take measures to correct the tilt. It will also be understood that when banking a plane for a turn or for coming down in a spiral, the position of the upper surface of the liquid relative to the scale markings of the gauge 13 will indicate the transverse angle to which the aircraft has been tilted and the pilot will be warned if the aircraft is in too steep a bank and liable to side slip.

In order that the gauge member 13 may cooperate with the scale bearing gauge members 7 for indicating longitudinal tilt of a plane, there have been provided pointers 23 which may be plastic and formed integral with the gauge member 13, or formed of metal or other suitable material and have their inner ends mounted at opposite ends of the horizontal axis of the gauge member. The alternative form of pointers 23' have been shown in Fig. 6 and from an inspection of this figure, it will be seen that their inner ends may be tightly fitted into sockets 24 formed in the gauge member 13, or embedded in the gauge member during molding of the same. The pointers extend horizontally from opposite sides of the front surface of the gauge member and their pointed tips 25 are bent so that they extend in overlapping relation to the flanges 9 for cooperation with the scale markings 10 thereon. When the aircraft is upon an even keel, the pointer which overlaps the gauge member secured to the side bar 3 at one side of the frame will point to the zero mark and the tip of the pointer which overlaps the gauge member secured to the side bar 2 at the other side of the frame will point to the 180° scale marking. When the aircraft is flying in the usual manner, the pilot will look at the gauge member 7 secured to the side bar 3 at the right hand side of the frame and as long as the tip of the pointer is disposed even with the zero marking 11, he will know that the plane is upon an even keel. If, however, the plane tilts longitudinally accidentally, or is nosed over for a landing or pulled up for a climbing angle, the pilot may look at the right hand gauge member and accurately determine whether the aircraft is disposed at a safe angle or is liable to go into a nose dive or stall due to too steep a climbing angle.

If the aircraft is moving straight ahead and is upon an even keel, vertical tilt will cause only this tilt to be indicated upon the gauge members 7 as the gauge member 13 remains in a vertical position and the liquid does not move circumferentially of this gauge member 13. If, however, the pilot has placed the aircraft in a right or left hand spiral, it is nosed over and also tilted transversely and by observing the position of the pointers relative to the gauge members 7 and the position of the upper surface of the liquid relative to the gauge markings 13', he can determine whether he is at a proper angle for spiraling or is liable to get into a side slip or a nose dive.

The gauge members at the sides of the instrument and the gauge member pivotally mounted between them may thus be read individually for indicating longitudinal tilt or transverse tilt of an aircraft or the pilot may look at both of them and the instrument will indicate both longitudinal tilt and transverse tilt.

As previously stated, the gauge member 7 at the right hand side of the instrument is used for indicating whether the aircraft is upon an even keel when flying in a normal position. When the aircraft is flying upside down the zero mark of the gauge member 7 at the left hand side of the instrument is presented forwardly and the pilot may then look at this gauge member and the companion pointer of the gauge member 13 and determine whether the aircraft is upon an even keel. It will thus be seen that when flying either in an upside down position or in an upright position, the pilot may look at the gauge member 7 which has the zero mark of its scale presented toward the pilot, and readily determine whether the aircraft is upon an even keel without it being necessary to determine the longitudinal tilt relative to the 180° mark of a gauge member when flying upside down.

What is claimed is:

A single instrument for indicating longitudinal and transverse tilting movements of an aircraft in flight comprising a base adapted to be mounted upon a portion of an aircraft within view of the pilot, a rectangular frame disposed upright upon said base and formed from a strip of stiff metal, said frame having an upper cross bar and vertical side bars connected at upper ends by the upper cross bar and having lower portions extending toward each other and forming a lower cross bar mounted upon said base, circular disks disposed vertically against inner sides of said side bars and formed with central openings aligned with openings formed through the side bars, fasteners passing through upper and lower portions of said side bars and said disks, an annular flange extending entirely about the periphery of each disk and projecting from the inner side of the disk laterally thereof and upon its outer surface bearing scale markings indicating degrees of a circle starting at a horizontal axis of the disk, one disk having a zero mark of its scale at the rear end of its horizontal axis and the other disk having its zero mark at the front end of its horizontal axis, a hollow transparent gauge member disposed vertically between said disks and having a horizontal axis extending transversely of the disks in alignment with the aligned openings in the disks and the side bars of said frame, pins adjustably passing through the aligned openings in the bars and the disks carried thereby and having inner ends engaging said gauge member at opposite ends of the horizontal axis thereof and tiltably mounting the said gauge member, there being degree markings arranged in a circle about a side face of the gauge member, liquid in the lower portion of the hollow gauge member having a flat horizontal upper surface cooperating with the degree markings on the said gauge member for indicating tilting of an aircraft transversely out of its normal position, and pointers carried by said gauge member adjacent opposite ends of the horizontal diameter thereof and extending horizontally from the said gauge member and radially of said disks and terminating in laterally extending tips overlapping the flanges from inner side edges thereof and disposed in cooperating relation to degree markings upon the flanges.

LEWIS B. RIES.

References Cited in the file of this patent

UNITED STATES PATENTS

| Number | Name | Date |
| --- | --- | --- |
| 474,152 | Taylor | May 3, 1892 |
| 1,258,597 | Mladinick | Mar. 5, 1918 |
| 1,271,049 | Marshall | July 2, 1918 |
| 1,290,685 | Townsley | Jan. 7, 1919 |
| 2,113,062 | Sottesz | Apr. 5, 1938 |
| 2,352,758 | Bauknecht | July 4, 1944 |
| 2,544,438 | Allgeo | Mar. 6, 1951 |
| 2,584,917 | Powell | Feb. 5, 1952 |